Aug. 31, 1948.　　　　G. P. HARDIN　　　　2,448,096
LIQUID FLOAT CIRCUIT BREAKER
Filed April 3, 1947　　　　　　　　　　　　2 Sheets-Sheet 1
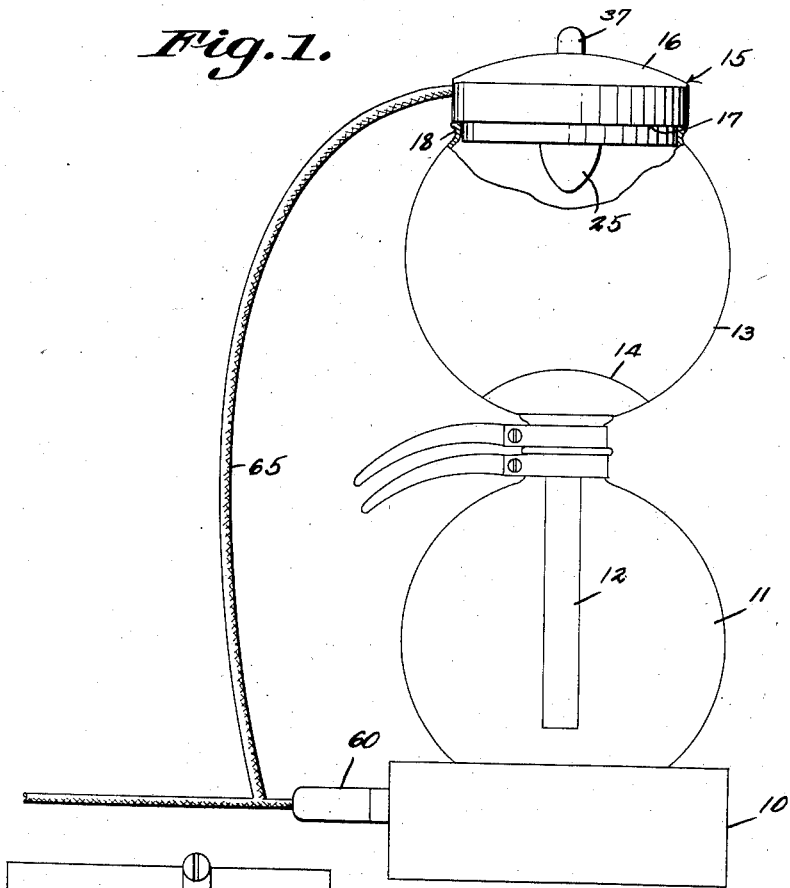
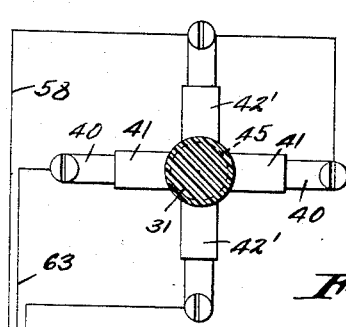
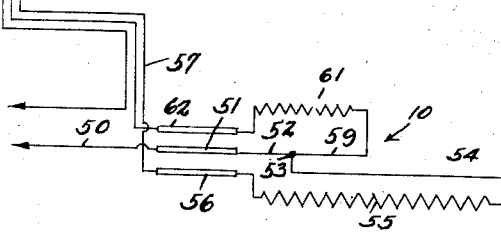
G. P. Hardin
Inventor
By C. A. Knowles.
Attorneys Aug. 31, 1948.　　　G. P. HARDIN　　　2,448,096
LIQUID FLOAT CIRCUIT BREAKER
Filed April 3, 1947　　　　　　　　　　　2 Sheets-Sheet 2

G. P. Hardin
Inventor

Patented Aug. 31, 1948

2,448,096

UNITED STATES PATENT OFFICE 2,448,096

LIQUID FLOAT CIRCUIT BREAKER

George P. Hardin, Atlanta, Ga., assignor of one-third to Carlton Blanchard Hardin and one-third to Carl Edward Hardin, both of Atlanta, Ga.

Application April 3, 1947, Serial No. 739,117

6 Claims. (Cl. 200—84)

This invention relates to a liquid float circuit breaker, and more particularly to such a device adapted primarily for use with coffee percolators or the like for the purpose of breaking circuit when the coffee has been sufficiently boiled.

A primary object of this invention is the provision of an improved float type circuit breaker for coffee percolators, such, for example, as that type of coffee maker comprised of upper and lower spherical receptacles, so arranged that water boiling in the lower receptacle is first passed upwardly through a tubular member over the coffee grounds in the upper receptacle, and then permitted to drip back through the grounds into the lower receptacle, adapted, when all the water that has been passed to the upper receptacle automatically to cut the circuit, reducing the wattage of the heating element from high to low.

An additional object of the invention is the provision of such a device adapted for use with two circuit electrical heating elements, so arranged as automatically to switch from one circuit to the other when the liquid level in the receptacle reaches a predetermined height.

A further object of the invention is the provision of such a device which is sturdy and durable in construction, reliable and efficient in operation, and relatively simple and inexpensive to manufacture and assemble.

Other objects reside in the combinations of elements, arrangements of parts, and features of construction, all of which will be more fully pointed out hereinafter and shown in the accompanying drawings.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1 is a side elevational view of a coffee percolator showing one form of the instant float-actuated circuit breaker associated therewith.

Figure 5 is a schematic wiring diagram, showing the electrical circuit of the device.

Similar reference characters refer to similar parts throughout the several views of the drawings.

Figure 2:
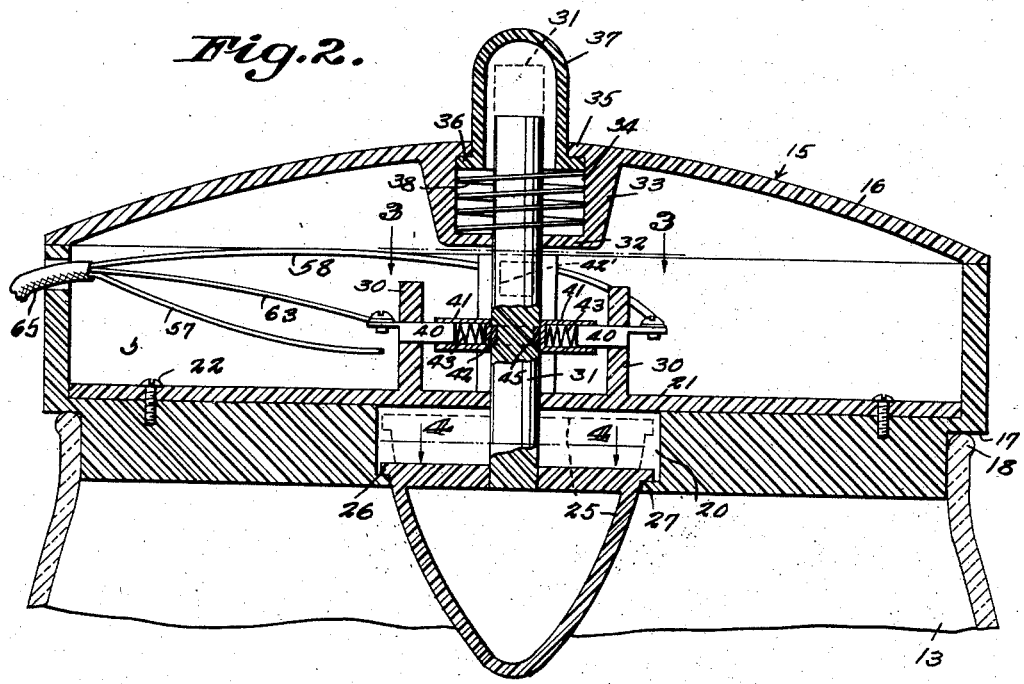
Figure 2 is an enlarged vertical sectional view taken substantially along the center line of the circuit breaker.
Figure 3:
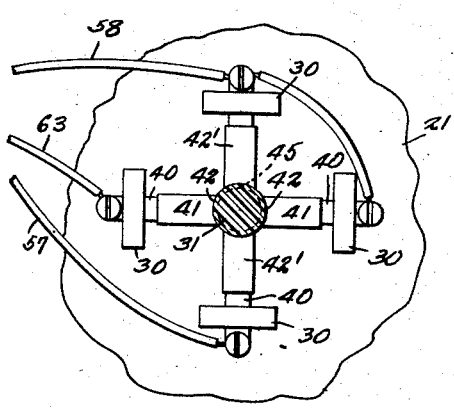
Figure 3 is a fragmentary sectional view taken substantially along the line 3—3 of Figure 2, as viewed in the direction indicated by the arrows.
Figure 4:
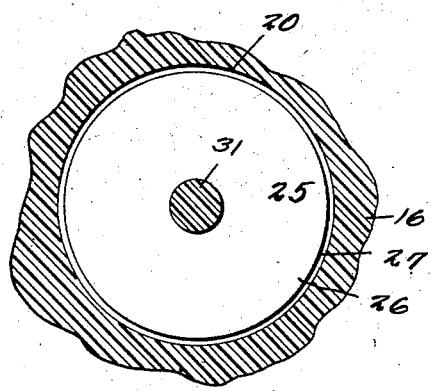
Figure 4 is a fragmentary sectional view taken substantially along the line 4—4 of Figure 2, as viewed in the direction indicated by the arrows.

Referring to the drawings in detail, and more particularly to Figure 1, there is generally indicated at 10 an electrical heating element, to be more fully described hereinafter, upon which is adapted to rest the lower spherical receptacle 11 of a conventional coffee maker. Receptacle 11 is adapted for the reception of a tubular portion 12, of an upper receptacle 13, the tubular portion extending substantially to the bottom thereof, and in use of the device for making coffee, grounds are adapted to be positioned as indicated at 14 in the upper receptacle, the electrical heating element energized, until water in the lower receptacle 11 has boiled, and passed through the tubular portion 12 upwardly into the receptacle 13. At such time, it is customary to deenergize the electrical heating element manually, whereupon as the apparatus cools, the water in the upper receptacle drains back through the grounds to the lower receptacle, thus making coffee. In the instant invention, automatic means are provided for deenergizing the electrical heating element when all the water has boiled into the top receptacle 13. Such means takes the form of a cap member generally indicated at 15, and including an outer casing 16, provided with a flange 17, adapted to rest on the rim 18 of the upper receptacle. The bottom of the casing 16, is provided with a central recess 20, the bottom being of substantial thickness, and the upper portion of the recess 20 is closed by a plate 21, extending substantially the full diameter of the cover, and secured to the base as by screws 22.

A float member 25, is positioned in such manner that its base, which is provided with a flange 26, is seated within the recess 20, and precluded from escaping therefrom by a coacting flange 27, formed at the base of the recess. The float member depends a substantial distance, as best shown in Figure 1, into the upper receptacle. It will thus be seen that when the upper receptacle 13 is filled with fluid, the float is raised to the position indicated in dotted lines in Figure 2, such movement being limited by the plate 21.

Positioned on the plate 21 are a plurality, in the illustrative embodiment shown 4, of projections 30 of insulating material, radially arranged about a central post 31, also of insulating material, secured to the upper portion of the float 25. The post extends through a suitable central aperture in the plate 21, and upwardly through an aperture in a flange 32 formed on a boss 33 depending from the top of the cover 16, into a recess 34.

The recess 34 is provided with an opening through the top of the cover 16, surrounded by a flange 35, adapted to coact with a corresponding opposite flange 36, carried by a push-button member 37, comprising a cap, and extending upwardly above the top of the cover 16, being normally biased to its uppermost position by means of a spring 38 contained in the recess 34. The shaft 31 engages frictionally in the apertures in plates 21 and flange 32, in such manner that when the float is raised to the dotted line position shown in Figure 2, in the manner previously described, the upper extremity of the shaft 31 assumes the dotted line position indicated in Figure 2, and retains such position as long as the fluid level in the container is high, and after the same is dropped, until returned manually to the position indicated in the full line by downward pressure on the push-button 37.

Referring back now to the projections 30, on the plate 21, each of these projections carries a post 40, surrounding which is a sleeve 41, the outer surface of which provides a contact surface 42 of arcuate configuration, spring biased as by means of the spring 43 toward the central post 31. The post 31 is provided with a band 45 of conductive material, so positioned that, when the parts are in full line position as indicated in Figure 2, the diametrically opposite contact sleeves 42 are placed in electrical association with each other through the medium of the band.

The second pair of contact members designated as 42', are identical in construction to those previously described, but are positioned at a relatively higher level than those previously described, in such manner that they will be bridged by the conductive band 45 when the float is in its uppermost position.

Referring now to the wiring diagram, shown in Figure 5, it will be seen that a wire 50 leads from any desired source of electrical energy to the central prong 51 of a three-pronged terminal 60 (see Figure 1) associated with the heating element 10. Interiorly of the heating element a wire 52 extends from terminal 51 to a junction 53, from which a wire 54 leads to a low wattage heating element 55, the opposite end of which is connected to the prong 56 of the plug 60.

A wire 57 leads from prong 56 to one of terminals 42', from the other of which a wire 58 leads back to the source of electrical energy. From the junction 53, a second wire 59 leads through a low high heating element 61 to the other prong 62 of plug 60, from which a wire 63 leads to one of terminals 43.

The other terminal 42' is connected to wire 58, which as previously pointed out leads back to the source of electrical current. All of wires 57, 58 and 63 may be contained in the cable 65, as best shown in Figure 1.

It will now be seen that when the contacts 43 are bridged, the high wattage heating element 61 is energized, thus imparting a relatively high heat to the fluid in receptacle 11, to bring the same to a boil, but that, conversely when the fluid has boiled, and the float is moved to its uppermost position, bridging the contacts 43', the high wattage heating element is cut out, and the low wattage heating element cut in, in such manner as to reduce the heat below the boiling point, but still impart sufficient heat to the device to maintain coffee in heated condition.

From the foregoing, it will now be seen that there is herein provided an improved float which, primarily adapted for use with coffee percolators, which accomplishes all the objects of this invention, and others, including many advantages of great practical utility in commercial importance.

It is to be noted that the device may be made in a diversity of shapes and sizes, to accommodate various types of percolators, and, when utilized with a one-element heating device, may be utilized as an automatic switch to cut off the heat entirely when the coffee has been boiled to a sufficient degree.

As many embodiments may be made of this inventive concept, and as many modifications may be made in the embodiment hereinbefore shown and described, it is to be understood that all matter herein is to be interpreted merely as illustrative, and not in a limiting sense.

What is claimed is:

1. In a float switch for coffee percolators, a hollow cap member including a recessed base plate adapted to fit over the top of the percolator, a float vertically movable in the recess, a post of insulating material carried by the upper portion of the float, a band of conductive material surrounding said post, and a pair of oppositely disposed contacts adapted to be connected to the percolator heating element and adapted to be bridged by said conductive band when said float is in its lowermost position, said float being elevated by the rising fluid in the percolator, whereby the band conductive material is elevated disengaging the oppositely disposed contacts breaking the circuit to the heating element.

2. In a float switch for coffee percolators, a hollow cap member including a recessed base plate adapted to fit over the top of a percolator, a float vertically movable in the recess, a post of insulating material carried by the upper portion of the float, a band of conductive material surrounding said post, and a pair of oppositely disposed contacts adapted to be connected to the percolator heating element and adapted to be bridged by said conductive band when said float is in its lowermost position, and a second pair of contacts positioned in the cap member above the said first-mentioned pair of contacts and adapted to be bridged when said float and its associated post is in its uppermost position to close a circuit.

3. In a float switch for coffee percolators, a hollow cap member including a recessed base plate adapted to fit over the top of a percolator, a float vertically movable in the recess, a post of insulating material carried by the upper portion of the float, a band of conductive material surrounding said post, and a pair of oppositely disposed contacts adapted to be connected to the percolator heating element and adapted to be bridged by said conductive band when said float is in its lowermost position, a second pair of contacts positioned in the cap member above the said first-mentioned pair of contacts and adapted to be bridged when said float and its associated post is in its uppermost position to close a circuit, and friction means for retaining the post in its uppermost position.

4. In a float switch for coffee percolators, a hollow cap member including a recessed base plate adapted to fit over the top of the percolator, a float vertically movable in the recess, a post of insulating material carried by the upper portion of the float, a band of conductive material surrounding said post, and a pair of oppositely disposed contacts adapted to be connected to the percolator heating element and adapted to be bridged by said conductive band when said float is in its lowermost position, a second pair of contacts positioned in the cap member above the said first-mentioned pair of contacts and adapted to be bridged when said float and its associated post is in its uppermost position to close a circuit, friction means for retaining the post in its uppermost position, and manual means for returning said post and its associated float to its lowermost position.

5. In a float switch for coffee percolators, a hollow cap member including a recessed base plate adapted to fit over the top of a percolator, a float vertically movable in the recess, a post of insulating material carried by the upper portion of the float, a band of conductive material surrounding said post, and a pair of oppositely disposed contacts adapted to be connected to the percolator heating element and adapted to be bridged by said conductive band when said float is in its lowermost position, a second pair of contacts positioned in the cap member above the said first-mentioned pair of contacts and adapted to be bridged when said float and its associated post is in its uppermost position to close a circuit, friction means for retaining the post in its uppermost position, manual means for returning said post and its associated float to its lowermost position, said last-mentioned means including a push-button extending outwardly through an aperture on top of the cap.

6. In a float switch for coffee percolators, a hollow cap member including a recessed base plate adapted to fit over the top of a percolator, a float vertically movable in the recess, a post of insulating material carried by the upper portion of the float, a band of conductive material surrounding said post, and a pair of oppositely disposed contacts adapted to be connected to the percolator heating element and adapted to be bridged by said conductive band when said float is in its lowermost position, a second pair of contacts positioned in the cap member above the said first-mentioned pair of contacts and adapted to be bridged when said float and its associated post is in its uppermost position to close a circuit, friction means for retaining the post in its uppermost position, manual means for returning said post and its associated float to its lowermost position, said last-mentioned means including a push-button extending outwardly through an aperture on top of the cap, and spring means biasing said push-button outwardly.

GEORGE P. HARDIN.

REFERENCES CITED

The following references are of record in the file of this patent:

UNITED STATES PATENTS

| Number | Name | Date |
| --- | --- | --- |
| 2,158,133 | Lemp | May 16, 1939 |